United States Patent
Nelson et al.

(10) Patent No.: US 6,661,207 B2
(45) Date of Patent: Dec. 9, 2003

(54) APPARATUS AND METHOD FOR PROTECTING SYNCHRONOUS GENERATORS AGAINST OFF-NOMINAL FREQUENCY DEVIATION AND ALTERNATING FORCES EXCITATION

(75) Inventors: Robert J. Nelson, Orlando, FL (US); Christopher W. Ross, Oviedo, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 83 days.

(21) Appl. No.: 10/024,694

(22) Filed: Dec. 17, 2001

(65) Prior Publication Data

US 2003/0111981 A1 Jun. 19, 2003

(51) Int. Cl.[7] .................................................. H02P 9/44
(52) U.S. Cl. ........................... 322/29; 322/20; 307/87; 323/211
(58) Field of Search ............................. 322/20, 29, 32; 307/85, 86, 87; 323/211

(56) References Cited

U.S. PATENT DOCUMENTS

| | | | | |
|---|---|---|---|---|
| 5,541,498 A | * | 7/1996 | Beckwith | 323/211 |
| 5,642,006 A | * | 6/1997 | Cech | 307/87 |
| 5,805,394 A | * | 9/1998 | Glennon | 361/20 |
| 5,808,449 A | * | 9/1998 | Hirayama et al. | 322/20 |
| 6,140,803 A | * | 10/2000 | Hurley et al. | 322/29 |
| 6,323,624 B1 | * | 11/2001 | Henriksen | 322/20 |
| 6,476,521 B1 | * | 11/2002 | Lof et al. | 307/105 |

* cited by examiner

Primary Examiner—Nicholas Ponomarenko

(57) ABSTRACT

An apparatus and method for protecting synchronous generators against off-nominal frequency deviation and alternating forces excitation is provided. Particular application can be found with generators within a power generator plant integrated into a power transmission grid system. A electrical relay system is in operative association with an electrical signal representative of an actual frequency at which the generator is operating and to an electrical signal representative of an actual forcing amount at which the generator is operating. The relay system is adapted to respond to the actual frequency signal and the actual forcing signal such that the relay system compares the actual frequency signal with a predetermined desired frequency range and compares the actual forcing signal with at least one predetermined forcing amount, and selectively alarms the unit operator or trips the generator to an off-line mode depending upon the comparisons.

11 Claims, 4 Drawing Sheets

$I_2$ = Negative-phase sequence current
$I_a$ = Largest of three-phase currents
$I_b$ = Smallest of three-phase currents
$I_c$ = Third phase current, of intermediate value

APPARATUS AND METHOD FOR PROTECTING SYNCHRONOUS GENERATORS AGAINST OFF-NOMINAL FREQUENCY DEVIATION AND ALTERNATING FORCES EXCITATION

FIELD OF THE INVENTION

The present invention relates in general to the field of synchronous generators, and more particularly, to an apparatus and method for protecting synchronous generators from off-nominal frequency deviation coincident with alternating forces excitation. The present invention has particular application when used with generators within a power generator plant integrated into a power transmission grid system.

BACKGROUND OF THE INVENTION

Many power generation plants produce electricity by converting potential energy (e.g. fossil fuel) into mechanical energy (e.g. rotation of a turbine shaft), and then converting the mechanical energy into electrical energy (e.g. by the principles of electromagnetic induction). These power generation plants typically use a turbine to convert the potential energy into mechanical energy and a generator to convert the mechanical energy into electricity.

The electricity is then distributed from the power generation plants to consumers through power transmission grid systems, such as those extending throughout the United States and portions thereof. These power grids operate at a predefined nominal frequency, such as 60 Hz in the United States and 50 Hz in Europe. This nominal frequency typically deviates by about +/−0–5 Hz during normal power grid operation due to a variety or reasons such as peak demand, low electricity output, inadvertent loss of load, tripping of generators or lines, and power grid operator selection. Individual power generation plants may be required to operate at frequencies that deviate by about +/−0–5 Hz from the power grid's nominal operating frequency (hereinafter "off-nominal frequency") to help compensate for line loads and other reasons.

One aspect of generator design involves the accommodation of typical off-nominal frequencies at which the generator may be required to operate. As part of such accommodative design, an off-nominal frequency relay is typically used to trip the generator to an off-line mode if the generator's off-frequency operation exceeds certain parameters that can otherwise lead to generator damage. For example, during underfrequency, it is possible to overexcite the core of the generator due to excessive Volts/Hertz excitation. This could lead to shorted laminations in the stator core. Also, since most generators are ventilated by a shaft-mounted blower and since some generators are excited by a shaft-mounted exciter, reductions in system frequency that lead to reduced speed of rotation may cause overheating of the generator or exciter. Additionally, operation at speeds other than nominal may excite mechanical resonances of generator components, leading to vibration and cyclic fatigue. In particular, generator shafts often have torsional natural frequencies that are close to twice normal operating frequency, so operation at off-nominal frequencies coincident with high levels of local negative sequence excitation (which causes a double frequency torque to be applied to the rotor) may cause torsional fatigue of rotating components.

Another aspect of generator design involves the accommodation of typical internal electrically based alternating forces excitation, such as negative sequence excitation and system harmonics, such as may be generated by electronic loads, arc furnaces, and HVDC power terminals. As part of such accommodative design, an negative sequence relay is typically used to alarm the operator or trip the generator to an off-line mode if the generator's negative sequence excitation exceeds certain parameters that can otherwise lead to generator damage. Negative sequence currents in the generator cause a double-frequency torque on the generator rotor and cause eddy currents to flow on the rotor surface, which could result in excessive heating and, in some cases, arcing. In recognition of this, generator standards provide parameters for expected amounts or levels of negative sequence currents for design (typically 6 to 10% of rated current). It is believed that these parameters were established based primarily on thermal considerations with the understanding that the system frequency would typically remain within a small bandwidth (e.g. about +/−1–2 Hz) of the power grid's nominal frequency. If the generator operates at frequencies outside this protective bandwidth while it is receiving negative sequence excitation, the generator may become susceptible to significant mechanical response and electrical eddy current damage. Mechanical resonance is caused by a natural electrical system frequency coinciding with the torsional natural frequency of the rotor shaft, which can cause fatigue damage. Although expensive damping systems can be used to mitigate resonance, such systems can introduce other operating difficulties that may negatively impact generator operation, possibly resulting in damage to the turbine and/or generator. Although off-nominal frequency operation and alternating forces excitation are independent events and the likelihood of coincidental simultaneous occurrence of these two events is small, such simultaneous occurrence is nevertheless possible. Normally, off-nominal frequency operation is system-wide, while alternate forces excitation is local in origin, typically caused by open transmission lines or failure of certain pieces of equipment. Heretofore, generator design did not generally account for the simultaneous occurrence of these two phenomena.

There is thus a need to for an apparatus and method for protecting synchronous generators against off-nominal frequency deviation and alternating forces excitation, and a synchronous generator that improves upon the prior art.

SUMMARY OF THE INVENTION

The present invention helps protect synchronous generators against off-nominal frequency deviation and alternating forces excitation. The present invention recognizes that linking off-nominal frequency operation with alternating forces excitation protection can provide several benefits, such as superior generator protection and an increase in the allowable operating frequency range of synchronous generators on a power grid. The present invention also provides a synchronous generator that improves upon the prior art.

One aspect of the present invention thus involves a linked electrical relay system adapted for use in a synchronous generator; the system comprising a electrical relay system in operative association with an electrical signal representative of an actual frequency at which the generator is operating and to an electrical signal representative of an actual forcing amount at which the generator is operating, the relay system adapted to respond to the actual frequency signal and the actual forcing signal, and wherein the relay system compares the actual frequency signal with a predetermined desired frequency range and compares the actual forcing signal with at least one predetermined forcing amount, and selectively alarms the operator or trips the generator to an off-line mode depending upon the comparisons.

Another aspect of the present invention involves a method for operating a synchronous generator, the method comprising; providing a relay system adapted to respond to an electrical signal representative of an actual frequency at which the generator is operating and to an electrical signal representative of an actual forcing amount at which the generator is operating; providing a desired off-nominal frequency range, a desired lower maximum forcing amount, and a desired upper maximum forcing amount; measuring an actual frequency at which the generator is operating, and measuring an actual forcing amount at which the generator is operating; comparing the actual frequency with the off-nominal frequency range, and comparing the actual forcing amount with the lower and/or upper forcing amounts; and selectively alarming the operator or tripping the generator to an off-line mode based upon the frequency comparison and the forcing comparison.

Yet another aspect of the present invention involves a synchronous generator, comprising; an axially extending rotor enclosed in an annular stator that surrounds and sleeves the rotor; a frequency source signal in operative association with the rotor and stator representative of an actual frequency at which the generator is operating; a forcing source signal in operative association with the rotor and stator representative of an actual forcing amount at which the generator is operating; a relay system adapted to respond to the frequency source signal and the forcing source signal by comparing the actual frequency with a predetermined desired frequency range and comparing the actual forcing amount with at least one predetermined maximum forcing amount, and selectively alarming the operator or tripping the generator to an off-line mode depending upon the comparisons.

Further aspects, features and advantages of the present invention will become apparent from the drawings and detailed description of the preferred embodiments that follow.

BRIEF DESCRIPTION OF THE DRAWINGS

The above-mentioned and other concepts of the present invention will now be addressed with reference to the drawings of the preferred embodiments of the present invention. The illustrated embodiments are intended to illustrate, but not to limit the invention. The drawings contain the following figures, in which like numbers refer to like parts throughout the description and drawings and wherein.

DETAILED DESCRIPTION OF THE PREFERRED EMBODIMENT

The invention described herein employs several basic concepts. For example, one concept relates to an apparatus and method for protecting synchronous generators against off-nominal frequency deviation and alternating forces excitation. Another concept relates to linking off-nominal frequency with alternating forces excitation.

The present invention is disclosed in context of use with an exemplary generator interconnected to a power grid. The principles of the present invention, however, are not limited to generators interconnected to power grids, and can be used in connection with other apparatus, methods, and systems that experience off-nominal frequency deviation and alternating forces excitation and/or torsional frequency and resonance. One skilled in the art may find additional applications for the apparatus, processes, systems, components, configurations, methods, and applications disclosed herein. Thus, the illustration and description of the present invention in context of an exemplary generator and power grid is merely one possible application of the present invention. However, the present invention has been found particularly suitable in connection with generators interconnected to power grids.

Figure 1:
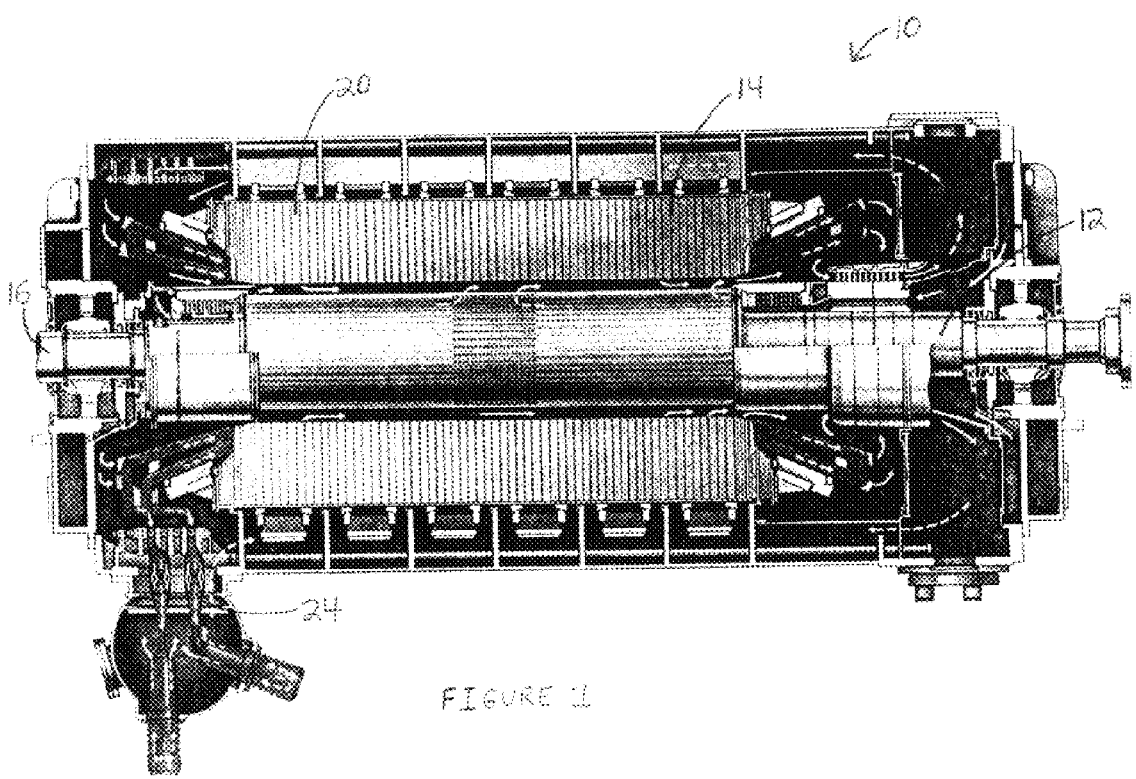
FIG. 1 is a side elevation cut view of a generator.

FIG. 1 shows a generator 10 comprising an axially extending rotor 12 enclosed in an annular stator 14 that surrounds and sleeves the rotor 12. The rotor 12 has a shaft 16 in which conductive coil windings 18 are axially arranged. The stator 14 has laminate punchings 20 that collectively form an annular core in which conductive coil windings 22 are positioned parallel with respect to the axial rotor coils 18. As the turbine shaft rotates the generator rotor 12, a DC electrical current is provided to the rotor coil windings 18. The rotating electrically charged rotor 12 creates a magnetic flux that induces an AC electrical current in the stationary stator coil windings 22. This induced AC electrical current is then drawn from stator leads 24 through one or more transformers and then to the power grid, and constitutes the electricity that the power generation plant provides to electricity consumers.

The generator 10 has a frequency source signal (not shown in FIG. 1) in operative association with the rotor 12 and stator 14 representative of an actual frequency at which the generator 10 is operating. The generator 10 also has a forcing source signal (not shown in FIG. 1) in operative association with the rotor 12 and stator 14 representative of an actual forcing level at which the generator 10 is operating. The term "forcing" is defined herein as alternating torque applied to the rotor of the generator 10. Forcing is typically caused by negative sequence excitation, which causes unequal loads to be applied to generator windings and oscillating torques to be applied to the generator rotating components. A relay system (not shown in FIG. 1) is adapted to respond to the frequency source signal and the forcing source signal by comparing the actual frequency with a predetermined desired frequency range and comparing the actual forcing level with at least one predetermined maximum forcing level. The relay system selectively trips the generator 10 to an off-line mode depending upon the comparisons.

Figure 2:
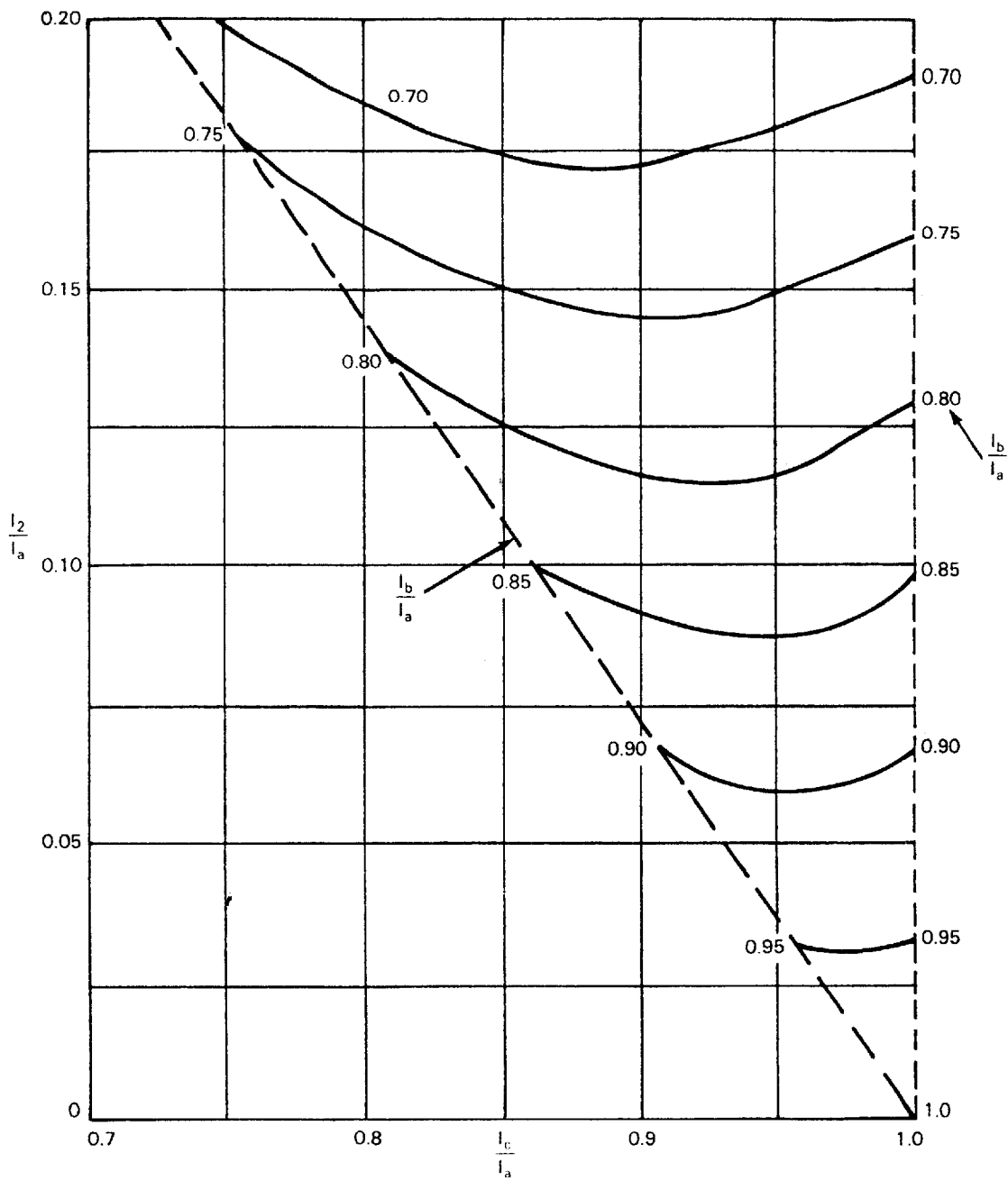
FIG. 2 is a diagram of a negative-phase sequence current calculation curve.

FIG. 2 shows a diagram of an exemplary standard negative-phase sequence current calculation curve. As shown, the negative-phase sequence current $I_2$ is a function of the three-phase currents Ia, Ib, Ic. One skilled in the art readily appreciates the relationship between negative-phase sequence current $I_2$ and negative sequence excitation, and that negative sequence excitation typically comprises the majority amount of alternating forces excitation and forcing. Negative sequence excitation typically causes a shaft torque proportional to the negative sequence current flow in the generator rotor and a corresponding torque at a frequency that is twice the system frequency (e.g., if the machine is operating synchronously with the system and the system frequency is 61 Hz and the negative sequence current flow in the stator windings is 5% of the machine capability, then an oscillating torque of roughly 5% of the steady-state torque, corresponding to a frequency of 122 Hz, is applied to the rotor.)

Figure 3:
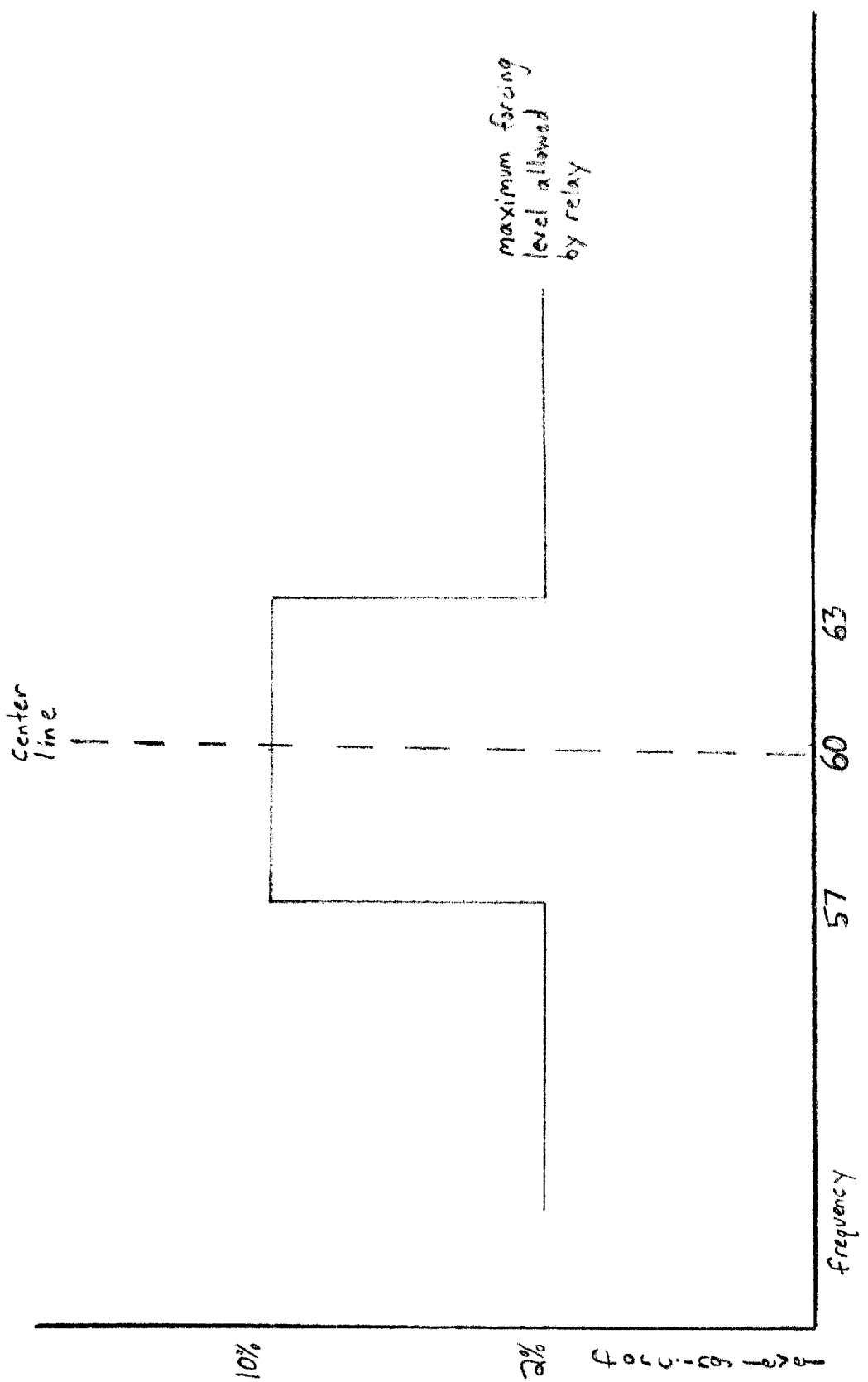
FIG. 3 is a diagram charting forcing level versus frequency deviation.

With reference now to FIG. 3, generator frequency versus forcing is charted. As shown, the generator 10 can accept a maximum level of forcing depending upon the generator's operating frequency. In the exemplary chart, if the generator 10 is operating at less than 50 Hz it can accept up to 2% forcing; if the generator 10 is operating at 50–60 Hz it can accept up to 8% forcing; and if the generator 10 is operating at over 60 Hz it can accept up to 2% forcing. A relay can be used as a cut-off mechanism to ensure that the generator 10 does not receive or accept any forcing above the predetermined maximum levels.

As will be understood by one skilled in the art, the frequency center line should typically be at about 50 or 60 Hz since that is the respective conventional nominal frequencies for Europe and the United States, although other convention-based frequencies can be used. Although the illustrated frequency range of the upper forcing level is 6 Hz (from 57 to 63 Hz), it could range from about 0–10 Hz or more depending upon the particular generator design and power grid. Although the illustrated maximum forcing range is 8% (from a low of 2% to a high of 10%), it can range from about 0–10% or more depending upon the particular generator design, power grid, and applicable standards. Although the illustrated lower maximum forcing level is 2%, it can range from 0–7% or more depending upon the particular generator design and power grid; similarly, although the illustrated upper forcing level is 8%, it can range from 0–10% or more.

The geometry of the frequency versus forcing line need not be stepped, but can also be rounded, saw-toothed, curved, angular, linear, and combinations thereof to depict that the forcing limit can vary in a manner that is more gradual and/or complex than shown, as will be understood one skilled in the art. The particular configuration of the frequency versus forcing line can depend upon the particular generator design and power grid.

Modern relays are typically programmable and multifunctional, so the relaying logic described herein can be programmed into a suitable generator protection module as will be understood by one skilled in the art, such as those commercially available from the Beckwith Electric Company, Inc. of Largo, Fla., such as Beckwith part number M-3425. The above-described linked relay system 26 can associate off-nominal frequency and alternating forces excitation and thereby provide several benefits, including superior generator protection and an increase in the allowable operating frequency range of synchronous generators 10 on a power grid. For example, in the event of a simultaneous occurrence of off-nominal frequency and alternating forces excitation, it is possible that neither the prior art off-nominal frequency relay nor the prior art negative sequence relay will trip the generator 10 to an off-line mode since the each relay operates separate and independent of the other relay and is guided by its own parameters. However, the above-described linked relay 26 is designed to alarm the operator or to trip the generator 10 in the event of such a simultaneous occurrence under certain conditions. For another example, it has been observed that worst cases for rotor torsional oscillations during off-nominal frequency operation tend to occur during high levels of alternating forces operation. Thus, since alternating forces excitation is a local (i.e. power plant or local transmission system) phenomenon, while off-nominal frequency is a system (i.e. power grid) phenomena, it is possible for a given isolated generator 10 to be operating a high levels of alternating forces. Consequently, it is possible to tolerate large frequency excursions if the generators 10 with high levels of alternating forces are taken off-line while the generators 10 with lower levels of alternating forces remain on-line.

It will be understood by those skilled in the art that the term "relay" as used herein refers to the equipment used to protect and control the generator and that the functions described herein could be incorporated into control equipment, such as turbine controls, that are not normally described as relays or protective equipment but are capable of some protective functions and are sometimes used to provided similar functionality.

Figure 4:
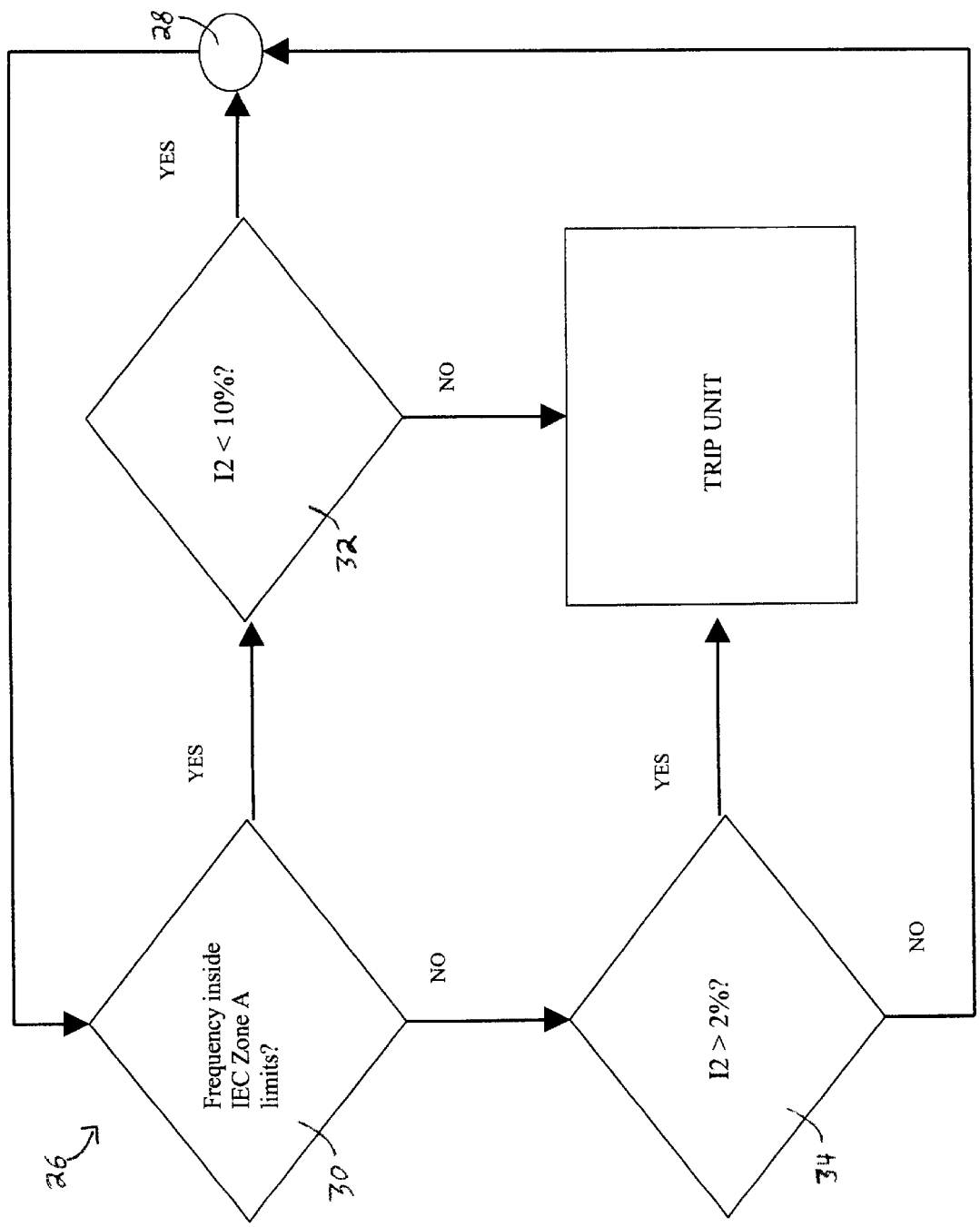
FIG. 4 is a flow diagram of a frequency deviation and alternating forces protection scheme.

Referring now to FIG. 4, a flow diagram shows use of the linked relay system 26 in a generator 10 for monitoring off-nominal frequency and alternating forces excitation. The linked relay system 28 is adapted to respond to the frequency source signal and the forcing source signal by comparing the actual frequency with a predetermined desired frequency range and comparing the actual forcing amount with at least one predetermined maximum forcing amount, and selectively tripping the generator 10 to an off-line mode depending upon these comparisons.

As shown in Box 30, the linked relay system 26 determines the off-nominal frequency. If the off-nominal frequency is within certain limits (e.g. IEC Zone A), then the linked relay system 26 determines if the forcing amount is below the upper forcing limit (e.g. less than 10%) for alternating forces excitation or forcing (Box 32). If the forcing amount is below the upper forcing limit, then the generator 10 is operating in a suitably safe mode and this process of monitoring the off-nominal frequency and alternating forces excitation is repeated as desired. If, however, the forcing is above the upper forcing limit, then the generator 10 is tripped to an off-line mode (Box 36).

Referring again to Box 32 of the flow diagram of FIG. 4, the linked relay system 28 determines the off-nominal frequency. If the off-nominal frequency is outside certain limits (e.g. IEC Zone A), then the linked relay system 26 determines if the forcing amount is below the lower forcing limit (e.g. less than 2%) for alternating forces excitation or forcing (Box 34). If the forcing amount is below the lower forcing limit, then the generator 10 is operating in a suitably safe mode and this process of monitoring the off-nominal frequency and alternating forces excitation is repeated as desired. If, however, the forcing is above the lower forcing limit, then the generator 10 is tripped to an off-line mode (Box 36).

It will be understood that, in operation, the linked relay system 28 need not follow the step sequence as shown in the exemplary flow diagram, but can also follow other step sequences, or include additional intermediate steps or a continuous variation in allowable forcing with frequency. For example, the linked relay system 28 can first determine the forcing amount and then determine the off-nominal frequency using an algorithm that accounts for the characteristics of the machine and the local frequency requirements.

Although this invention has been described in terms of certain exemplary uses, preferred embodiments, and possible modifications thereto, other uses, embodiments and possible modifications apparent to those of ordinary skill in the art are also within the spirit and scope of this invention. It is also understood that various aspects of one or more features of this invention can be used or interchanged with various aspects of one or more other features of this invention. Accordingly, the scope of the invention is intended to be defined only by the claims that follow.

What is claimed is:

1. A linked electrical relay system adapted for use in a synchronous generator, the system comprising:

a electrical relay system in operative association with an electrical signal representative of an actual frequency at which the generator is operating and to an electrical signal representative of an actual forcing level at which the generator is operating, the relay system adapted to respond to the actual frequency signal and the actual forcing signal, wherein the relay system compares the actual frequency signal with a predetermined desired frequency range and compares the actual forcing signal with at least one predetermined forcing level, and selectively alarms the operator or trips the generator to an off-line mode depending upon the comparison.

2. The linked electrical relay system of claim 1, wherein if the actual frequency signal is within the predetermined desired frequency range, then the relay system compares the actual forcing signal with a predetermined lower forcing level.

3. The linked electrical relay system of claim 1, wherein if the actual frequency signal is outside the predetermined desired frequency range, then the relay system compares the actual forcing signal with a predetermined upper forcing level.

4. A method for operating a synchronous generator, the method comprising:

providing a relay system adapted to respond to an electrical signal representative of an actual frequency at which the generator is operating and to an electrical signal representative of an actual forcing amount at which the generator is operating;

providing a desired off-nominal frequency range, a desired lower forcing amount, and a desired upper forcing amount;

measuring an actual frequency at which the generator is operating, and measuring an actual forcing amount at which the generator is operating;

comparing the actual frequency with the off-nominal frequency range, and comparing the actual forcing amount with the lower and/or upper forcing amounts; and selectively alarming the operator or tripping the generator to an off-line mode based upon the frequency comparison and the forcing comparison.

5. The method of claim 4, wherein the actual forcing amount is compared with the lower forcing amount.

6. The method of claim 4, wherein the actual forcing amount is compared with the upper forcing amount.

7. The method of claim 4, wherein the actual forcing amount is compared with the upper forcing amount if the actual frequency is within the off-nominal frequency range.

8. The method of claim 7, wherein the generator is tripped to an off-line mode if the actual forcing amount is above the upper forcing limit.

9. The method of claim 4, wherein the actual forcing amount is compared with the lower forcing amount if the actual frequency is outside the off-nominal frequency range.

10. The method of claim 9, wherein the operator is alarmed or the generator is tripped to an off-line mode if the actual forcing amount is above the lower forcing limit.

11. A synchronous generator, comprising:

an axially extending rotor enclosed in an annular stator that surrounds and sleeves the rotor;

a frequency source signal in operative association with the rotor and stator representative of an actual frequency at which the generator is operating;

a forcing source signal in operative association with the rotor and stator representative of an actual forcing amount at which the generator is operating; and a relay system adapted to respond to the frequency source signal and the forcing source signal by comparing the actual frequency with a predetermined desired frequency range and comparing the actual forcing amount with at least one predetermined maximum forcing amount, and selectively alarming the operator or tripping the generator to an off-line mode depending upon the comparisons.

* * * * *